(12) United States Patent
Yang et al.

(10) Patent No.: US 11,483,219 B2
(45) Date of Patent: Oct. 25, 2022

(54) SYSTEMS AND METHODS FOR THERMAL MITIGATION OF USER EQUIPMENT

(71) Applicant: Verizon Patent and Licensing Inc., Basking Ridge, NJ (US)

(72) Inventors: Jin Yang, Orinda, CA (US); Xin Wang, Morris Plains, NJ (US); Yuexin Dong, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/304,483

(22) Filed: Jun. 22, 2021

(65) Prior Publication Data

US 2021/0314244 A1 Oct. 7, 2021

Related U.S. Application Data

(63) Continuation of application No. 16/668,993, filed on Oct. 30, 2019, now Pat. No. 11,063,851.

(51) Int. Cl.
| | |
|---|---|
| *H04L 12/00* | (2006.01) |
| *H04L 43/065* | (2022.01) |
| *H04W 24/10* | (2009.01) |
| *H04W 72/04* | (2009.01) |
| *H04W 4/38* | (2018.01) |

(52) U.S. Cl.
CPC ............. *H04L 43/065* (2013.01); *H04W 4/38* (2018.02); *H04W 24/10* (2013.01); *H04W 72/0413* (2013.01); *H04W 72/0446* (2013.01); *H04W 72/0453* (2013.01)

(58) Field of Classification Search
CPC ............ H04W 72/0453; H04W 8/22; H04W 72/0446; H04W 4/38; H04W 72/0413; H04W 24/10; H04L 43/08; H04L 41/0816; H04L 41/16; H04L 41/145; H04L 43/16; H04L 43/065
USPC .................................................. 709/220, 221
See application file for complete search history.

(56) References Cited

U.S. PATENT DOCUMENTS

| | | | |
|---|---|---|---|
| 9,049,572 B2 | 6/2015 | Kissinger et al. | |
| 9,161,314 B2 * | 10/2015 | Balasubramanian | ........................ G08B 21/182 |
| 9,646,429 B2 * | 5/2017 | Rousu | ..................... G07C 5/008 |
| 9,671,841 B2 | 6/2017 | Venkatesan | |
| 10,732,890 B2 | 8/2020 | Kaynak et al. | |

(Continued)

FOREIGN PATENT DOCUMENTS

| | | |
|---|---|---|
| CN | 102811145 | 12/2015 |
| EP | 3249489 | 11/2017 |
| EP | 3389024 | 10/2018 |

OTHER PUBLICATIONS

Chen, et al., "The temperature monitoring method of board and temperature monitoring system in a kind of network", 2015, 10 pages (translation of Chinese patent referenced as a patent reference).

*Primary Examiner* — Frantz Coby

(57) ABSTRACT

A device may receive a thermal report from a user equipment. The thermal report may indicate a temperature of the user equipment. The device may determine, based on the thermal report, whether the temperature of the user equipment satisfies a temperature threshold. The device may select a network action to reduce the temperature of the user equipment based on the temperature of the user equipment satisfying the temperature threshold. The device may perform the network action.

20 Claims, 7 Drawing Sheets

(56) References Cited

U.S. PATENT DOCUMENTS

| | | |
|---|---|---|
| 11,063,851 B2 * | 7/2021 | Yang .................. H04L 41/0816 |
| 2015/0323940 A1 | 11/2015 | Venkatesan |
| 2015/0338859 A1 | 11/2015 | Lei et al. |
| 2015/0341252 A1 | 11/2015 | Felgate et al. |
| 2019/0041926 A1 | 2/2019 | Guy et al. |

\* cited by examiner

SYSTEMS AND METHODS FOR THERMAL MITIGATION OF USER EQUIPMENT

RELATED APPLICATION

This application is a continuation of U.S. patent application Ser. No. 16/668,993, entitled "SYSTEMS AND METHODS FOR THERMAL MITIGATION OF USER EQUIPMENT," filed Oct. 30, 2019, which is incorporated herein by reference in its entirety.

BACKGROUND

An individual may rely on user equipment (e.g., a smart phone) to communicate with others and/or access data via a network device (e.g., a base station). Often, the individual may maintain the user equipment in a powered-on state and in constant communication with a network. In some cases, the user equipment may be susceptible to overheating.

DETAILED DESCRIPTION OF PREFERRED EMBODIMENTS

Figure 1A:
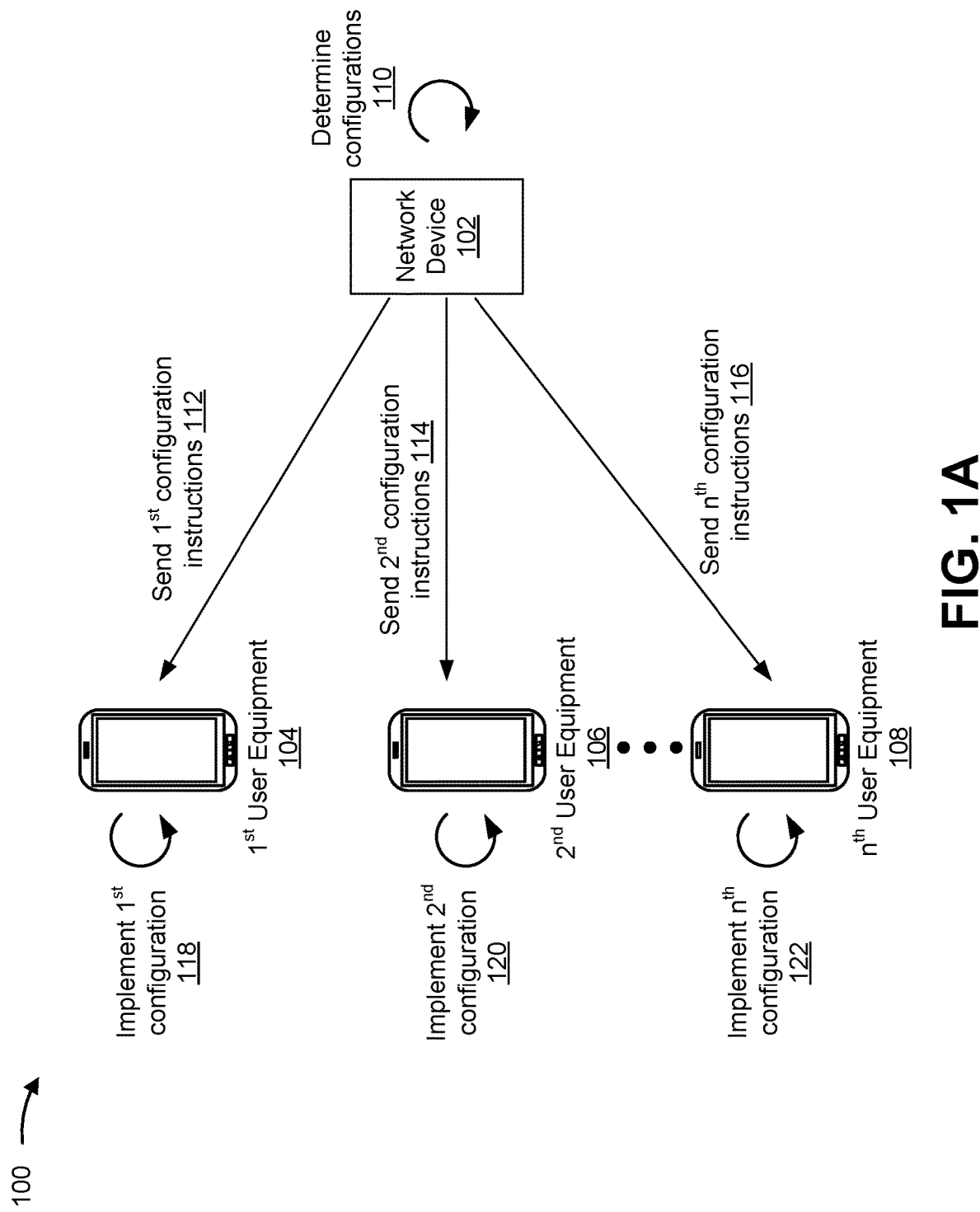
FIGS. 1A-1D are diagrams of one or more example implementations described herein.

The following detailed description of example implementations refers to the accompanying drawings. The same reference numbers in different drawings may identify the same or similar elements.

In a fifth generation (5G) network, a base station (BS) may enable enhanced connectivity capabilities for users due to availability of a greater amount of bandwidth in a frequency range, such as a millimeter wave (mmWave) frequency range. For example, a user may use a user equipment (UE), such as a smart phone, smart watch, and/or the like, to communicate with the BS to access large amounts of data and/or communicate with another device in a highly congested area (e.g., a football stadium, an arena, and/or the like).

However, the UE may also include hardware needed to operate at more than one frequency band. For example, the UE may include separate chips for a 5G mmWave modem and 5G mmWave antenna modules. Additionally, to achieve faster network download speeds and/or transmit higher quantities of data, a UE may place a greater load on the hardware. For example, a user may use the UE to quickly download a season of a television show, which causes a processor to consume more energy. This increase in and greater strain on the hardware may lead to more power consumption, and the increase in power consumption may in turn lead to an increase in heat generated by the UE. Heating of the UE may be further exacerbated by environmental factors, such as outside temperature, case design, and/or the like. For example, if the user exposes the UE to direct sunlight and/or carries the UE in a case that limits heat dissipation, the UE may quickly heat to levels that may be harmful to the UE.

In some instances, an increase in temperature of the UE may cause the UE to disconnect from the 5G network (e.g., switch to a fourth generation (4G) network) and/or shut down. Such connectivity problems waste resources and impact user experience. For example, when the UE shuts down due to overheating, the UE may waste computing resources to shut down the UE, and later, to restore power to the UE. Furthermore, the BS may waste network resources re-establishing connectivity, restoring a session, and/or the like. Overheating may also physically damage the hardware (e.g., a processor, battery, and/or the like), leading to long-term performance problems and/or failure of the UE.

Some implementations described herein provide a network device (a base station, a network controller, and/or the like), that performs one or more thermal mitigation measures to reduce an elevated temperature of a UE. The network device may be configured to receive a thermal report from the UE. The thermal report may specify the temperature of the UE. The network device may determine whether the temperature satisfies a temperature threshold. Based on whether the temperature satisfies the temperature threshold, the network device may select and perform a network action designed to reduce the temperature of the UE. In some implementations, the network device may perform one or more additional network actions to further reduce the temperature of the UE to an optimal level.

By performing one or more thermal mitigation measures to reduce the temperature of the UE, the network device may eliminate a need for the UE to perform self-preservation measures, such as disconnecting from the 5G network and/or shutting down. Accordingly, the network device may conserve resources and improve user experience. In particular, the network device may conserve computing resources that might otherwise be spent shutting down and later restoring power to the UE. Furthermore, the network device may conserve network resources that might otherwise be wasted re-establishing connectivity, restoring a session, and/or the like. By preventing the UE from overheating, the network device may also protect the hardware (e.g., processor, battery, and/or the like) and prevent resulting performance problems and/or failure of the UE.

Figure 1B:
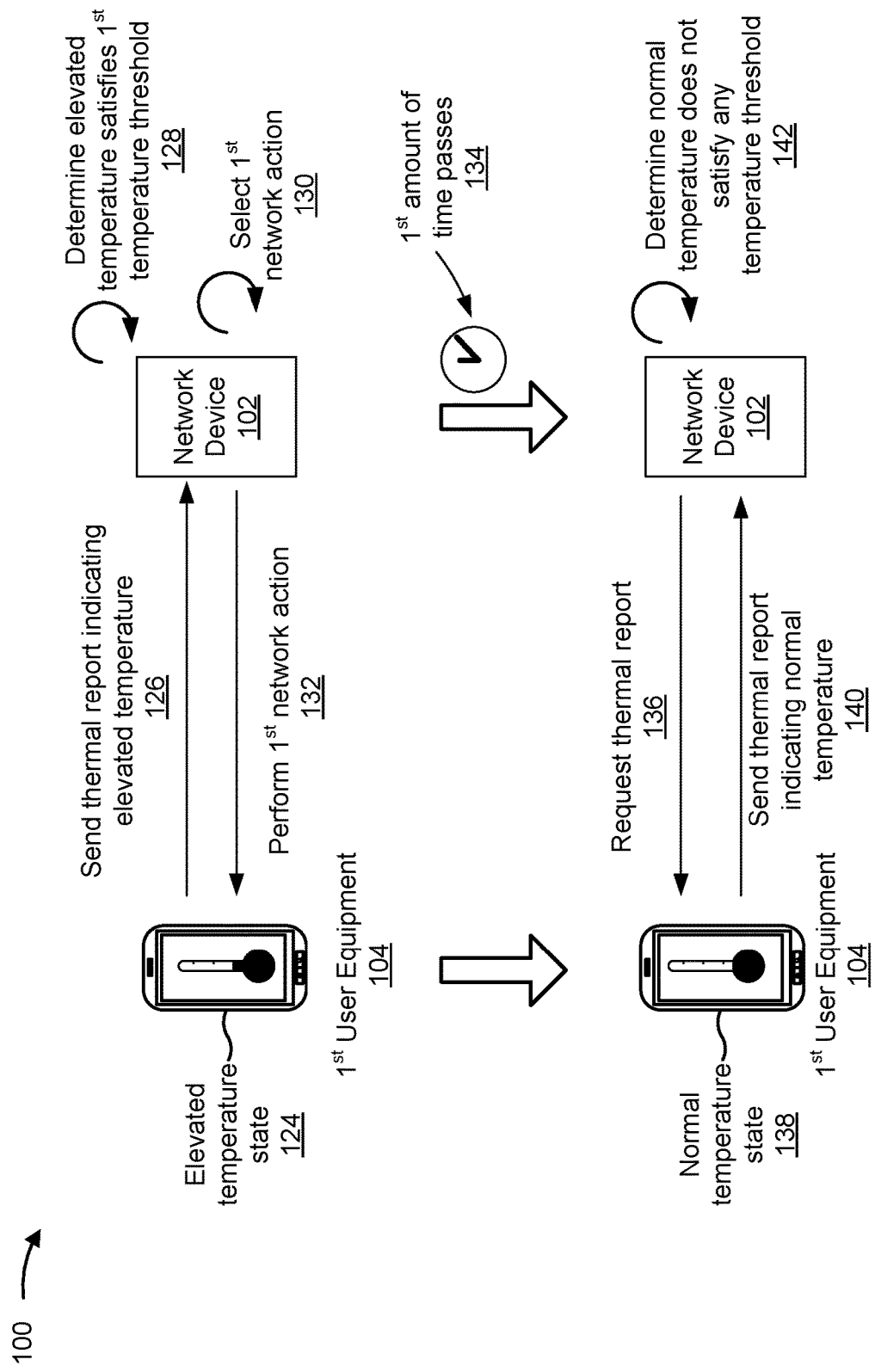
Figure 1C:
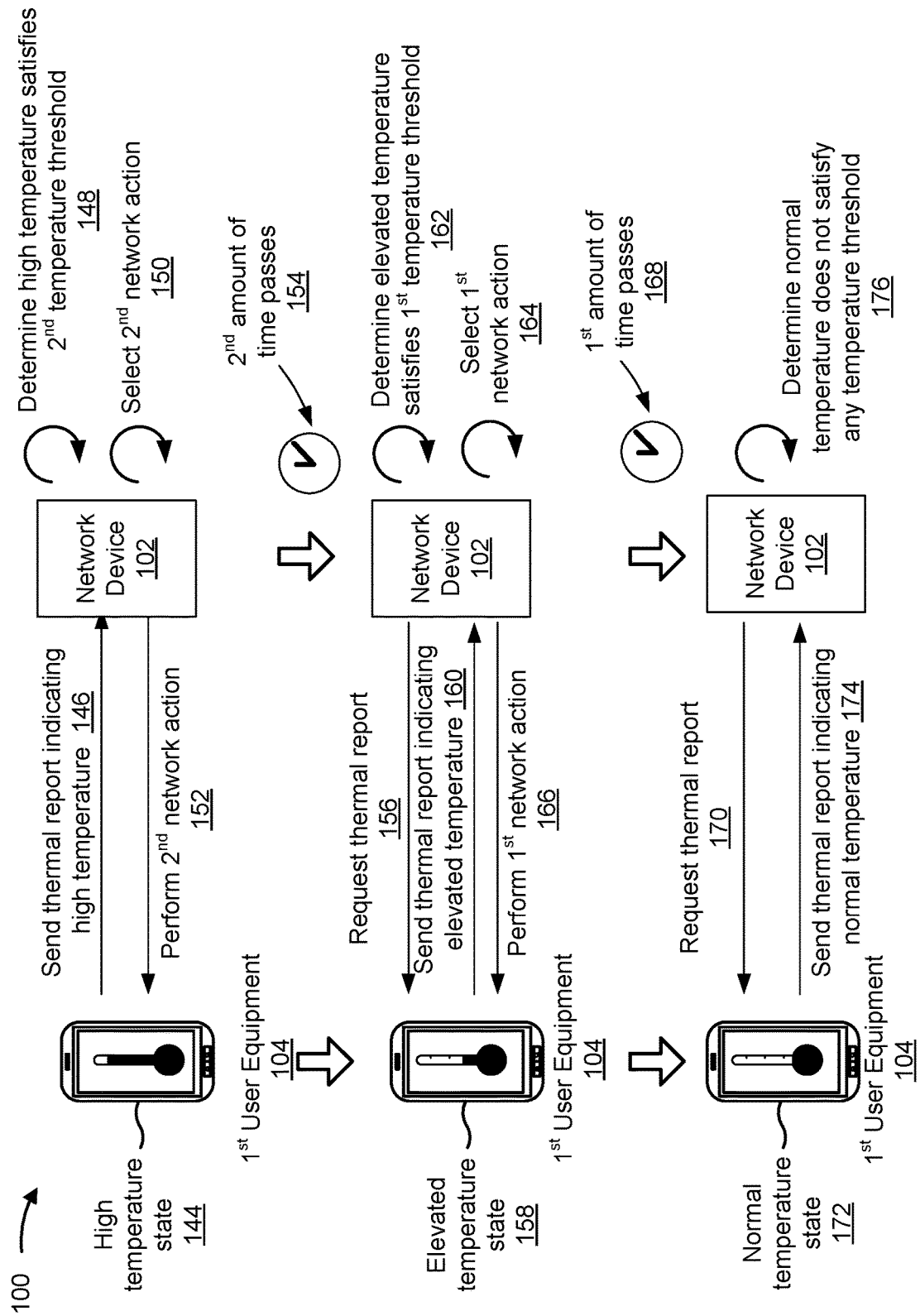
Figure 1D:
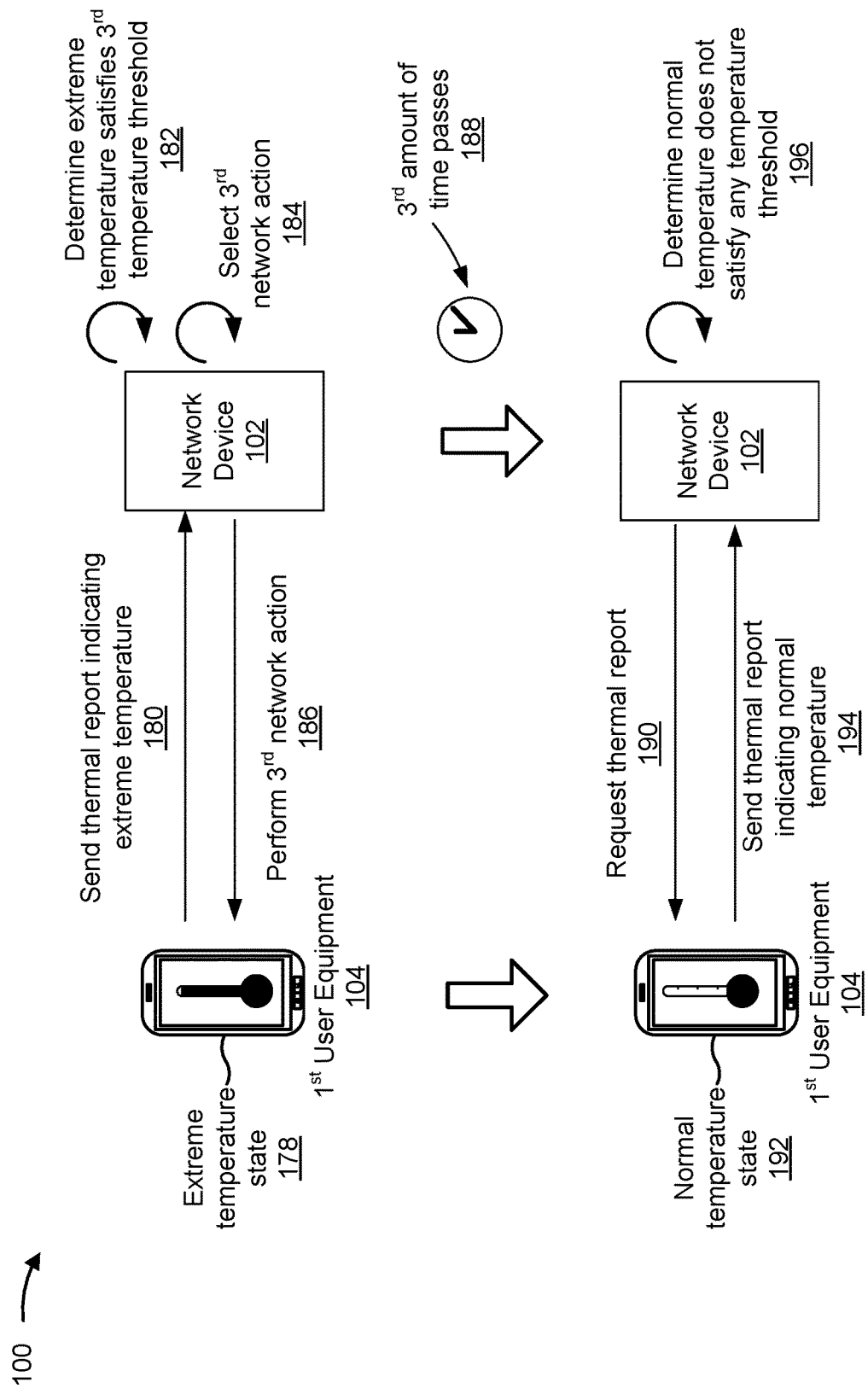

FIGS. 1A-1D are diagrams of one or more example implementations 100 described herein. FIG. 1A illustrates an example of a network device 102 (e.g., a base station, a network controller, and/or the like) interacting with a plurality of user equipment (UEs), which include a first UE 104, a second UE 106, and an nth UE 108, to configure the plurality of UEs for operation. FIGS. 1B-1D illustrate one or more examples of the network device 102 interacting with a UE (e.g., the first UE 104) to reduce a temperature of the UE.

In the example of FIG. 1A, the network device 102 may provide network coverage over an area, which may be referred to as a cell. The cell may encapsulate and allow direct communication between each of the plurality of UEs and the network device 102. There may be situations where a UE (e.g., each of the plurality of UEs, one of the plurality of UEs, one or more of the plurality of UEs, and/or the like) overheats. For example, the UE may overheat when accessing large amounts of data (e.g., when playing a game, when streaming video, and/or the like), when exposed to a high temperature environment (e.g., an environment temperature of 37 degrees Celsius and/or the like), and/or the like.

To mitigate any potential harm caused by overheating, the network device 102 may communicate with the UE. For example, the network device 102 may determine a configuration for the UE. In some implementations, the network device 102 may determine configurations for the plurality of UEs, as shown by reference number 110. The configuration for one UE may be different from the configuration for another UE. Additionally, or alternatively, the configurations for multiple UEs (e.g., all of the plurality of UEs, a subset of the plurality of UEs, and/or the like) may be the same. The configuration, for the UE, may be related to a thermal report to be sent by the UE to the network device 102 to initiate a thermal mitigation process. The configuration may include information relating to a content and/or a timing of the thermal report and/or other information relating to the UE that may be useful in mitigating heating issues of the UE.

In some implementations, the configuration may specify a content of the thermal report. The content may indicate a temperature of the UE (e.g., a temperature value, an indicator that the temperature of the UE satisfies a threshold, and/or the like). Additionally, or alternatively, the content may indicate one or more characteristics of the UE. The one or more characteristics may include a type of the UE (e.g., iPhone 6S), a type of wireless network connection used by the UE (e.g., mmWave NR, long term evolution (LTE), and/or the like), an operating mode of the UE (e.g., a number of component carriers (CCs) being used by the UE, that carrier aggregation (CA) or dual connectivity (DC) is being used by the UE, a number of multiple input multiple output (MIMO) layers being used by the UE, and/or the like), a battery state of the UE (e.g., a battery charge state), a capability of the UE (e.g., a maximum number of CCs that the UE is capable of using, whether the UE is capable of using CA or DC, a maximum number of MIMO layers that the UE is capable of using, a maximum number of antennas that the UE is capable of using, a number of transmit and receive chains that the UE has, and/or the like), a location of the UE (e.g., geographic coordinates within a cell, a cell identifier, a distance from the network device 102, and/or the like), and/or the like.

Additionally, or alternatively, the content may include a thermal history of the UE. The thermal history may incorporate one or more prior thermal reports of the UE, one or more prior network actions taken based on the one or more prior thermal reports, a corresponding one or more results of the one or more prior network actions, and/or the like. For example, the UE may issue a first thermal report followed by a second thermal report. Assume that the first thermal report indicated that the UE reached a temperature of 30 degrees Celsius. To reduce the temperature, the network device 102 performed a network action, resulting in a temperature decrease of 8 degrees Celsius for the UE. Accordingly, the second thermal report may incorporate the first thermal report and specify the network action and the resulting temperature decrease of 8 degrees Celsius.

In some implementations, the configuration may specify a timing of the thermal report. The configuration may indicate when the UE is to send the thermal report to the network device 102. In some implementations, the configuration may specify that the UE is to use a temperature-based reporting. For example, the configuration may indicate that the UE is to send the thermal report to the network device 102 after the UE determines that the temperature of the UE satisfies a temperature threshold. In this case, the configuration may indicate the temperature threshold the UE is to use to make the determination. As an example, the temperature threshold may be in a range from approximately 22 degrees Celsius to approximately 44 degrees Celsius. As another example, the temperature threshold may be 24 degrees Celsius, 32 degrees Celsius, 40 degrees Celsius, and/or the like.

In some implementations, the configuration, when specifying the temperature-based reporting, may include a set of temperature thresholds, such as a set of temperature thresholds in the range from approximately 22 degrees Celsius to approximately 44 degrees Celsius. The set of temperature thresholds may include one temperature threshold, two temperature thresholds, three temperature thresholds, and/or the like. In some implementations, the set of temperature thresholds may include a first temperature threshold and a second temperature threshold. The first temperature threshold may indicate a first temperature, and the second temperature threshold may indicate a second temperature, e.g., greater than the first temperature. For example, the first temperature may be 24 degrees Celsius, and the second temperature may be 32 degrees Celsius. In some implementations, the set of temperatures may include a third temperature threshold that indicates a third temperature. The third temperature may be greater than the second temperature. For example, the third temperature may be 40 degrees Celsius.

Additionally, or alternatively, the configuration may specify that the UE is to use a timing-based reporting. For example, the configuration may indicate that the UE is to send the thermal report to the network device 102 using a regular time interval. For example, the configuration may indicate that the UE is to send the thermal report to the network device 102 every 24 hours, every 12 hours, every hour, and/or the like (e.g., regardless of the temperature of the UE, only when the temperature of the UE satisfies a threshold, and/or the like). As another example, the configuration may indicate that the UE is to send the thermal report to the network device 102 at particular times. For example, the configuration may indicate that the UE is to send the thermal report to the network device 102 at 4 p.m. every day, during daytime hours every day, and/or the like (e.g., regardless of the temperature of the UE, only when the temperature of the UE satisfies a threshold, and/or the like).

Additionally, or alternatively, the configuration may specify that the UE is to use a network-based reporting. For example, the configuration may indicate that the UE is to send the thermal report to the network device 102 based on receiving a request from the network device 102.

Additionally, or alternatively, the configuration may specify that the UE is to use a UE-based reporting after the UE sends the thermal report (e.g. via the temperature-based reporting, the timing-based reporting, the network-based reporting, and/or the like). For example, the configuration may indicate that that the UE is to send an updated thermal report to the network device 102 after the UE determines that further thermal mitigation is needed. The UE may determine that further thermal mitigation is needed by performing a series of operations. The series of operations may include detecting that the network device 102 performed a network action, setting a timer, and after the timer satisfies a time threshold, determining that a temperature of the UE satisfies a temperature threshold.

After the network device 102 determines the configuration for the UE, the network device 102 may send configuration instructions, related to the configuration, to the UE. In some implementations, the network device 102 may send configuration instructions to the plurality of UEs. For example, as shown respectively by reference numbers 112, 114, and 116, the network device 102 may send first configuration instructions to the first UE 104, second configuration instructions to the second UE 106, and nth configuration instructions to the nth UE 108. In some implementations, the first configuration instructions may be different from the second configuration instructions and/or the nth configuration instructions. In some implementations, the first configuration instructions may be the same as the second configuration instructions and/or the nth configuration instructions.

The UE may receive the configuration instructions and may store the configuration instructions in memory. The UE may parse the configuration instructions to understand how to implement the configuration included in the configuration instructions. The UE may implement the configuration by executing the configuration instructions. To implement the configuration, the UE may store certain data, such as one or more temperature thresholds, in memory, may start or modify a process relating to thermal mitigation, and/or the like. Once the UE implements the configuration, the UE may be ready to receive thermal mitigation measures from the network device 102.

In some implementations, when the network device 102 sends configuration instructions to the plurality of UEs, the plurality of UEs may implement the configurations. As shown respectively by reference numbers 118, 120, and 122, the first UE 104 may implement the first configuration, the second UE 106 may implement the second configuration, and the nth UE 108 may implement the nth configuration. As described above, the first configuration for the first UE 104 may be the same as, or different from, the second configuration for the second UE 106 and/or the nth configuration for the nth UE 108.

In FIGS. 1B-1D, assume the network device 102 configured the first UE 104 with a first temperature threshold, a second temperature threshold, and a third temperature threshold. In this example, the first temperature threshold may indicate a first temperature of 24 degrees Celsius. The second temperature threshold may indicate a second temperature of 32 degrees Celsius. The third temperature threshold may indicate a third temperature of 40 degrees Celsius. These are just examples of temperature thresholds that may be used. In practice, a different quantity of temperature thresholds may be used and/or different temperature threshold values may be used.

In FIG. 1B, assume that the first UE 104 is in an elevated temperature state 124 based on the first UE 104 detecting an elevated temperature (e.g., a temperature in a particular temperature range, such as a temperature range that satisfies the first temperature threshold and does not satisfy the second temperature threshold). In accordance with the configuration, the first UE 104 may generate a thermal report by compiling information from a memory and/or one or more sensors (e.g., a temperature sensor, a voltmeter, and/or the like). The thermal report may indicate the elevated temperature and/or satisfaction of the first temperature threshold. As described above, the thermal report may include additional content (e.g., specifying a type of the first UE 104, a type of wireless network connection used by the first UE 104, an operating mode of the first UE 104, a battery state of the first UE 104, a capability of the first UE 104, a location of the first UE 104, a thermal history of the first UE 104, and/or the like).

As shown by reference number 126, the first UE 104 may send the thermal report to the network device 102. The first UE 104 may send the thermal report as one or more packets on an uplink channel to the network device 102. The first UE 104 may send the thermal report via radio resource control (RRC) layer signaling (e.g., instead of lower layer signaling). The network device 102 may receive the thermal report from the first UE 104. The network device 102 may parse the thermal report to identify the elevated temperature of the first UE 104, satisfaction of the first temperature threshold, and/or the additional content of the thermal report.

As shown by reference number 128, the network device 102 may determine that the elevated temperature of the first UE 104 satisfies the first temperature threshold. For example, the network device 102 may compare the elevated temperature indicated in the thermal report with the first temperature threshold, the second temperature threshold, and/or the third temperature threshold. The network device 102 may determine that the elevated temperature of the first UE 104 satisfies the first temperature threshold and does not satisfy the second temperature threshold or the third temperature threshold. As another example, the network device 102 may determine that the elevated temperature of the first UE 104 satisfies the first temperature threshold and not the second temperature threshold or the third temperature threshold based on the thermal report indicating satisfaction of the first temperature threshold.

Based on the elevated temperature of the first UE 104 satisfying the first temperature threshold, the network device 102 may select a first network action, as shown by reference number 130, from a plurality of network actions. The plurality of network actions may include, with respect to the first UE 104, adjusting a number of CCs used in CA and/or DC (e.g., adjusting a number of CCs in an NR secondary cell group (SCG)), adjusting a number of MIMO layers, adjusting a bandwidth being used to monitor a physical downlink control channel (PDCCH), adjusting an amount of time slots being used to monitor a PDCCH, changing a traffic path (e.g., moving an uplink primary path from mmWave NR to LTE), triggering a switch from a first frequency band to a second frequency band (e.g., from mmWave NR to sub-6 GHz NR or LTE), de-configuring one or more NR SCGs, and/or the like.

In some implementations, the elevated temperature of the first UE 104 satisfying the first temperature threshold may act as a trigger for a selection process. For example, based on the trigger, the network device 102 may select the first network action randomly from the plurality of network actions. In another example, based on the trigger, the network device 102 may select the first network action from a ranked listing of the plurality of network actions. The network device 102 may generate the ranked listing based on a determination of potential impacts of the plurality of network actions on reducing temperature. The network device 102 may order network actions within the ranked listing from network actions having the most potential impact on reducing temperature (e.g., listed at a top of the ranked listing) to network actions having the least potential impact on reducing temperature (e.g., listed at a bottom of the ranked listing). Differences in potential impact may be attributed to different types of the plurality of network actions (e.g., adjusting MIMO layers compared to de-configuring one or more NR SCGs) or different degrees of application of the plurality of network actions (e.g., reducing the number of CCs exponentially compared to reducing the number of CCs linearly).

In some implementations, based on the trigger, the network device 102 may consider additional content of the thermal report (e.g., a type of the first UE 104, a type of wireless network connection used by the first UE 104, an operating mode of the first UE 104, a battery state of the first UE 104, a capability of the first UE 104, a location of the first UE 104, a thermal history of the first UE 104, and/or the like) when selecting the first network action. For example, the network device 102 may identify a subset of the plurality of network actions that the network device 102 has determined to be most applicable to the additional content. In this situation, the network device 102 may select the first network action randomly from the subset. In another example, the network device 102 may generate a ranked listing of the subset based on a determination of potential impacts of the subset on reducing temperature, ordering network actions from most-to-least potential impact on reducing temperature. In this situation, the network device 102 may select the first network action from the ranked listing of the subset.

In some implementations, the elevated temperature of the first UE 104 satisfying the first temperature threshold may be a factor for the selection process. For example, based on the elevated temperature, the network device 102 may identify a subset of the plurality of network actions that the network device 102 has determined to be sufficient to mitigate the elevated temperature (e.g., in contrast to network actions that are insufficient). In this situation, the network device 102 may select the first network action randomly from the subset. In another example, the network device 102 may generate a ranked listing of the subset based on a determination of potential impacts of the subset on reducing temperature, ordering network actions from most-to-least potential impact on reducing temperature. In this situation, the network device 102 may select the first network action from the ranked listing of the subset. In either of the above examples, the network device 102, by preventing selection of network actions that would be insufficient to mitigate the elevated temperature, may conserve computing and/or network resources that would otherwise be wasted selecting insufficient network actions.

In some implementations, the elevated temperature of the first UE 104 satisfying the first temperature threshold, along with the additional content (e.g., one or more of a type of the first UE 104, a type of wireless network connection used by the first UE 104, an operating mode of the first UE 104, a battery state of the first UE 104, a capability of the first UE 104, a location of the first UE 104, a thermal history of the first UE 104, and/or the like), may be factors for a selection process. For example, based on the elevated temperature and the additional content, the network device 102 may identify a subset of the plurality of network actions that the network device 102 has determined to be sufficient to reduce the elevated temperature (e.g., in contrast to network actions that are insufficient), given the additional content. In this situation, the network device 102 may select the first network action randomly from the subset. In another example, the network device 102 may generate a ranked listing of the subset based on a determination of potential impacts of the subset on reducing temperature, ordering network actions from most-to-least potential impact on reducing temperature. In this situation, the network device 102 may select the first network action from the ranked listing of the subset. In either of the above examples, the network device 102, by preventing selection of network actions that would be insufficient to mitigate the elevated temperature, may conserve computing and/or network resources that would otherwise be wasted performing insufficient network actions.

In some implementations, the network device 102 may use one or more artificial intelligence techniques, such as machine learning, deep learning, and/or the like to select the first network action from the plurality of network actions to mitigate the elevated temperature. Based on application of a rigorous and automated process associated with analyzing thousands or millions of data items, the network device 102 enables improved selection from the plurality of network actions to optimize mitigation of the elevated temperature state 124 of the first UE 104 with minimal communication interruption.

In some implementations, the network device 102 may generate a model for use in thermal mitigation. For example, the network device 102 may train a model using historical data, such as historical data relating to UEs (also referred to herein as UE parameters) (e.g., previously-reported temperatures of the UEs, types of the UEs, types of wireless network connections of the UEs, operating modes of the UEs, battery states of the UEs, capabilities of the UEs, locations of the UEs, thermal histories of the UEs, and/or the like); historical data relating to network actions taken to mitigate elevated temperatures of the UEs (also referred to herein as network action parameters) (e.g., which of the plurality of network actions were performed; if multiple network actions were performed, in what order were the multiple network actions performed; and/or the like); historical data relating to results of taking the network actions (also referred to as result parameters) (e.g., whether the elevated temperatures were reduced, how much the elevated temperatures were reduced, at what rate the elevated temperatures were reduced, an amount of time to reduce the elevated temperatures to satisfy a temperature threshold or no longer satisfy a temperature threshold, and/or the like); and/or the like.

In some implementations, the network device 102 may perform a data preprocessing operation when generating the model. For example, the network device 102 may preprocess the historical data to remove non-ASCII characters, white spaces, confidential data, and/or the like. In this way, the network device 102 may organize thousands, millions, or billions of data items for machine learning and model generation.

In some implementations, the network device 102 may perform a training operation when generating the model. For example, the network device 102 may portion the historical data into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the network device 102 may preprocess and/or perform dimensionality reduction to reduce the historical data to a minimum feature set. In some implementations, the network device 102 may train the model on this minimum feature set, thereby reducing processing to train the machine learning model, and may apply a classification technique, to the minimum feature set.

In some implementations, the network device 102 may use a classification technique, such as a logistic regression classification technique, a random forest classification technique, a gradient boosting machine learning (GBM) technique, and/or the like, to determine a categorical outcome (e.g., that one or more network services are to be performed, that one or more other network service are not to be performed, and/or the like). Additionally, or alternatively, the network device 102 may use a naïve Bayesian classifier technique. In this case, the network device 102 may perform binary recursive partitioning to split the historical data of the minimum feature set into partitions and/or branches and use the partitions and/or branches to perform predictions (e.g., that a particular network service will mitigate an elevated temperature for a particular UE). Based on using recursive partitioning, the network device 102 may reduce utilization of computing resources relative to manual, linear sorting and analysis of data items, thereby enabling use of thousands, millions, or billions of data items to train a model, which may result in a more accurate model than using fewer data items.

Additionally, or alternatively, the network device 102 may train the model using a supervised training procedure that includes receiving input to the model from a subject matter expert, which may reduce an amount of time, an amount of processing resources, and/or the like to train the model relative to an unsupervised training procedure. In some implementations, the network device 102 may use one or more other model training techniques, such as a neural network technique, a latent semantic indexing technique, and/or the like. For example, the network device 102 may perform an artificial neural network processing technique (e.g., using a two-layer feedforward neural network architecture, a three-layer feedforward neural network architecture, and/or the like) to perform pattern recognition with regard to patterns of whether certain network actions were successful or not successful in mitigating increased temperatures of UEs having certain UE parameters. In this case, using the artificial neural network processing technique may improve an accuracy of the model generated by the network device 102 by being more robust to noisy, imprecise, or incomplete data, and by enabling the network device 102 to detect patterns and/or trends undetectable to human analysts or systems using less complex techniques.

In some implementations, the model, generated by the network device 102, may be used to predict which one or more network actions are to be performed to successfully mitigate an increased temperature of a UE with certain UE parameters. In other words, the network device 102 may input, into the model, data relating to one or more UE parameters of a UE and the model may output data relating to one or more network services that are to be performed. The output of the model may include a respective score for each of the one or more network services. The score, for a network service, may represent a likelihood that the network service will successfully mitigate the elevated temperature of the UE. In some implementations, the output of the model may include a plurality of scores for a plurality of network actions. In this case, the network device 102 may select at least one of the plurality of network actions based on the plurality of scores. In some implementations, the network device 102 may select two or more network actions to perform and may determine an order for performing the two or more network actions based on their scores.

In some implementations, a different device, such as a server device, may generate and train the model. The different device may send the model for use by the network device 102. The different device may update and send (e.g., on a scheduled basis, on an on-demand basis, on a triggered basis, on a periodic basis, and/or the like) the model to the network device 102. In some implementations, the network device 102 may update the model.

Accordingly, the network device 102 may select the first network action, as shown by reference number 130, using any number of artificial intelligence techniques (e.g., machine learning techniques, deep learning techniques, and/or the like). Over time, utilizing the artificial intelligence techniques may conserve resources that would otherwise be wasted selecting and/or performing ill-suited network actions (e.g., as a result of a random selection, a subset selection, a ranked listing selection, and/or the like).

It has been described that the network device 102 uses a selection process to select the first network action to perform. In practice, the network device 102 may use any one or more of the selection processes described above, and/or one or more different selection processes, to select multiple network actions to perform, may determine an order in which to perform the multiple network actions, may use a result of one network action to determine whether to perform another network action, may use a result of one network action to select which other network action to perform, and/or the like. The network device 102 selects the one or more network actions to mitigate the elevated temperature of the first UE 104.

After the network device 102 selects the first network action, the network device 102 may perform the first network action, as shown by reference number 132. For example, when performing the first network action, the network device 102 may modify a configuration of the network device 102, may modify a configuration of the first UE 104, may modify a manner in which the first UE 104 communicates with the network device 102 or a network with which the first UE 104 is associated, and/or the like.

In practice, similar to that described above, the network device 102 may perform the first network action by performing one or more of the plurality of network actions. For example, the network device 102 may perform the first network action by reducing a number of CCs in CA and/or DC. By doing so, the network device 102 configures the first UE 104 to transmit and/or receive a fewer number of CCs, thereby conserving power and/or processing resources. Thus, the network device 102 may reduce heat generated by a battery and/or a processor of the first UE 104. Additionally, or alternatively, the network device 102 may perform the first network action by reducing a number of MIMO layers. By doing so, the network device 102 reduces a number of data streams and therefore reduces heat generated by the battery and/or processor. Additionally, or alternatively, the network device 102 may perform the first network action by reducing a bandwidth and/or a number of times slots being used to monitor a PDCCH. By configuring the first UE 104 to monitor a smaller bandwidth with fewer time slots for signal detection, the network device 102 reduces heat generated by the battery and/or the processor of the first UE 104. Additionally, or alternatively, the network device 102 may perform the first network action by changing a traffic path and/or triggering a switch from a first frequency band to a second frequency band (e.g., from mmWave NR to sub-6 GHz NR or LTE). By doing so, the network device 102 conserves power and/or processing resources used for beam transmission and thus reduces heat generated by the first UE 104. Additionally, or alternatively, the network device 102 may perform the first network action by de-configuring one or more NR SCGs. By doing so, the network device 102 conserves power and/or processing resources used by the first UE 104 and thereby reduces heat.

After the network device 102 performs the first network action, the network device 102 may set a timer for a first amount of time. In one example, the first amount of time may be selected arbitrarily by a network operator and/or the network device 102. In another example, the first amount of time may be selected by a network operator and/or the network device 102 (e.g., via machine learning, historical data analysis, and/or the like) as an amount of time that will allow the first network action to decrease the elevated temperature some amount. In another example, the first amount of time may be selected by the network operator and/or the network device 102 (e.g., via machine learning, historical data analysis, and/or the like) to be a minimum amount of time to resolve the elevated temperature state 124 (e.g., reduce the elevated temperature to a temperature that does not satisfy the first temperature threshold). In some implementations, for example when the configuration of the first UE 104 includes UE-based reporting, the first UE 104 may set the timer for the first amount of time after detecting that the network device 102 performed the first network action.

After the first amount of time passes, as shown by reference number 134, the network device 102 may request an updated thermal report, as shown by reference number 136, to determine whether the first network action was successful in resolving the elevated temperature state 124. To request the updated thermal report, the network device 102 may send one or more packets on a downlink channel to the first UE 104.

Assume that the elevated temperature of the first UE 104 has decreased to a normal temperature (e.g., a temperature in a particular temperature range, such as a temperature range that does not satisfy any of the first temperature threshold, the second temperature threshold, and the third temperature threshold), such that the first UE 104 is in a normal temperature state 138. Complying with the request from the network device 102, and in a manner similar to that described above in connection with reference number 126, the first UE 104 may generate and send the updated thermal report to the network device 102, as shown by reference number 140, via one or more packets on an uplink channel. Similar to that described above, the first UE 104 may send the thermal report via RRC layer signaling, instead of lower layer signaling. The updated thermal report may indicate the normal temperature and/or a lack of satisfaction of the first temperature threshold, the second temperature threshold, and the third temperature threshold. Similar to that described above, the updated thermal report may include additional content (e.g., specifying a type of the first UE 104, a type of wireless network connection used by the first UE 104, an operating mode of the first UE 104, a battery state of the first UE 104, a capability of the first UE 104, a location of the first UE 104, a thermal history of the first UE 104, and/or the like).

As shown by reference number 142, the network device 102, after receiving the updated thermal report, may determine that the normal temperature does not satisfy the first temperature threshold, the second temperature threshold, or the third temperature threshold. Similar to an example described above, the network device 102 may compare the normal temperature indicated in the updated thermal report with the first temperature threshold, the second temperature threshold, and/or the third temperature threshold. As another example, the network device 102 may determine that the normal temperature of the first UE 104 does not satisfy the first temperature threshold, the second temperature threshold, or the third temperature threshold based on the updated report indicating a lack of satisfaction of any of the temperature thresholds.

Thus, as shown in FIG. 1B, the network device 102 may resolve the elevated temperature state 124 of the first UE 104 in a single iteration. In some implementations, however, the network device 102 may use a different number of iterations to resolve the elevated temperature state 124 of the first UE 104, such as a number of iterations of receiving a thermal report, determining whether a temperature indicated in the thermal report satisfies a threshold, and/or selectively performing a network action.

In some implementations, for example when the configuration of the first UE 104 includes UE-based reporting, the first UE 104 may determine (e.g., using a temperature sensor) that the elevated temperature decreased to the normal temperature. In this example, because the first UE 104 determined that no further thermal mitigation was necessary, the first UE 104 may not send the updated thermal report. Thus, with the UE-based reporting, the network device 102 may resolve the elevated temperature state 124 without requesting an updated thermal report, as shown by reference number 136, without the first UE 104 generating and sending the updated thermal report, as shown by reference number 140, and/or without the network device 102 processing the updated thermal report to determine that the normal temperature does not satisfy any temperature threshold, as shown by reference number 142. By eliminating the requesting, generating, sending, and processing of the updated thermal report, computing resources (e.g., processor resources, memory resources, communication resources, and/or the like) and network resources are conserved that would otherwise be used to request, generate, send, and process the updated thermal report.

In FIG. 1C, assume that the first UE 104 is in a high temperature state 144, which indicates a high temperature (e.g., a temperature in a particular range, such as a temperature range that satisfies the second temperature threshold and does not satisfy the third temperature threshold). Similar to that described above, the first UE 104 may generate the thermal report by compiling information from a memory and/or one or more sensors (e.g., a temperature sensor, a voltmeter, and/or the like) of the first UE 104. As shown by reference number 146, the first UE 104 may send the thermal report to the network device 102 via one or more packets on an uplink channel. Similar to that described above, the first UE 104 may send the thermal report via RRC layer signaling, instead of lower layer signaling. The thermal report may indicate the high temperature and/or satisfaction of the second temperature threshold. Similar to that described above, the thermal report may include additional content (e.g., specifying a type of the first UE 104, a type of wireless network connection used by the first UE 104, an operating mode of the first UE 104, a battery state of the first UE 104, a capability of the first UE 104, a location of the first UE 104, a thermal history of the first UE 104, and/or the like).

The network device 102, upon receipt of the thermal report and as shown by reference number 148, may determine (e.g., via comparison of the high temperature with the first temperature threshold, the second temperature threshold, and/or the third temperature threshold) that the high temperature satisfies the second temperature threshold. Based on the high temperature satisfying the second temperature threshold, the network device 102 may select a second network action, as shown by reference number 150, from the plurality of network actions described above.

The network device 102 may select the second network action via a selection process, similar to those described above in connection with reference number 130. For example, the network device 102 may select the second network action randomly from the plurality of network actions. As another example, the network device 102 may select the second network action from a ranked listing of the plurality of network actions. The network device 102 may generate the ranked listing based on a determination of potential impacts of the plurality of network actions on reducing temperature. As another example, the network device 102 may select the second network action randomly from a subset of the plurality of network actions that the network device 102 has determined to be most applicable (e.g., given the high temperature and/or the additional content). As another example, the network device 102 may select the second network action from a ranked listing of the subset, based on a determination of potential impacts of the plurality of network actions on reducing temperature. As a further example, the network device 102 may use one or more artificial intelligence techniques, such as machine learning, deep learning, and/or the like, to select the second network action from the plurality of network actions. In some implementations, the second network action, selected by the network device 102, may be a network action that has a greater impact on reducing the temperature of the first UE 104 (e.g., reduces the temperature at a faster rate, reduces the temperature by a greater amount, and/or the like) than the first network action selected for when the first UE 104 is in the elevated temperature state 124.

After the network device 102 selects the second network action, as shown by reference number 150, the network device 102 may perform the second network action, as shown by reference number 152. For example, when performing the second network action, the network device 102 may modify a configuration of the network device 102, may modify a configuration of the first UE 104, may modify a manner in which the first UE 104 communicates with the network device 102 or a network with which the first UE 104 is associated, and/or the like. In practice, similar to that described above, the network device 102 may perform the second network action by reducing a number of CCs in CA and/or DC, reducing a number of MIMO layers, reducing a bandwidth being used to monitor a PDCCH, reducing an amount of time slots being used to monitor a PDCCH, changing a traffic path, triggering a switch from a first frequency band to a second frequency band (e.g., from mmWave NR to sub-6 GHz NR or LTE), de-configuring the NR SCG, and/or the like.

After the network device 102 performs the second network action, the network device 102 may set a timer for a second amount of time. Similar to that described above, in one example, the second amount of time may selected arbitrarily by the network operator and/or the network device 102. In another example, the second amount of time may be selected by a network operator and/or the network device 102 (e.g., via machine learning, historical data analysis, and/or the like) as an amount of time that will allow the second network action to decrease the high temperature some amount. In another example, the second amount of time may be selected by a network operator and/or the network device 102 (e.g., via machine learning, historical data analysis, and/or the like) to resolve the high temperature state 144 (e.g., reduce the high temperature to a temperature that does not satisfy the second temperature threshold and/or the first temperature threshold). In some implementations, for example when the configuration of the first UE 104 includes UE-based reporting, the first UE 104 may set the timer for the second amount of time after detecting that the network device 102 performed the second network action.

After the second amount of time passes, as shown by reference number 154, the network device 102 may request an updated thermal report, as shown by reference number 156, to determine whether the second network action was successful in resolving the high temperature state 144. To request the updated thermal report, the network device 102 may send one or more packets on a downlink channel to the first UE 104.

Assume that a temperature of the first UE 104 has decreased to an elevated temperature (e.g., a temperature in a particular temperature range, such as a temperature range that satisfies the first temperature threshold and does not satisfy the second temperature threshold), such that the first UE 104 is in an elevated temperature state 158. Complying with the request from the network device 102, the first UE 104 may compile information from a memory and/or one or more sensors to generate the updated thermal report. As shown by reference number 160, the first UE 104 may send the updated thermal report to the network device 102 by sending one or more packets on an uplink channel. Similar to that described above, the updated thermal report may indicate the elevated temperature, satisfaction of the first temperature threshold, and/or additional content (e.g., specifying a type of the first UE 104, a type of wireless network connection used by the first UE 104, an operating mode of the first UE 104, a battery state of the first UE 104, a capability of the first UE 104, a location of the first UE 104, a thermal history of the first UE 104, and/or the like).

In some implementations, for example when the configuration of the first UE 104 includes UE-based reporting, the first UE 104 may determine (e.g., via a temperature sensor) that the high temperature decreased to the elevated temperature and not all the way to the normal temperature state, thereby requiring further thermal mitigation. In this example, the first UE 104 may send the updated thermal report to the network device 102, as shown by reference number 160, without previously receiving the request from the network device 102.

As shown by reference number 162, the network device 102, after receiving the updated thermal report via the uplink channel, may determine that the elevated temperature satisfies the first temperature threshold. Similar to that described above, the network device 102 may compare the elevated temperature indicated in the updated thermal report with the first temperature threshold, the second temperature threshold, and/or the third temperature threshold. As another example, the network device 102 may determine that the elevated temperature of the first UE 104 satisfies the first temperature threshold based on the updated thermal report indicating satisfaction of the first temperature threshold.

Based on the elevated temperature satisfying the first temperature threshold, the network device 102 may select a first network action, as shown by reference number 164, via a selection process, similar to those described above. For example, the network device 102 may select the first network action randomly from the plurality of network actions. As another example, the network device 102 may select the first network action from a ranked listing of the plurality of network actions. The network device 102 may generate the ranked listing based on a determination of potential impacts of the plurality of network actions on reducing temperature. As another example, the network device 102 may select the first network action randomly from a subset of the plurality of network actions that the network device 102 has determined to be most applicable (e.g., given the elevated temperature and/or the additional content). As another example, the network device 102 may select the first network action from a ranked listing of the subset, based on a determination of potential impacts of the plurality of network actions on reducing temperature. As a further example, the network device 102 may use one or more artificial intelligence techniques, such as machine learning, deep learning, and/or the like, to select the first network action from the plurality of network actions.

After the network device 102 selects the first network action, the network device 102 may perform the first network action, as shown by reference number 166. For example, when performing the first network action, the network device 102 may modify a configuration of the network device 102, may modify a configuration of the first UE 104, may modify a manner in which the first UE 104 communicates with the network device 102 or a network with which the first UE 104 is associated, and/or the like. In practice, similar to that described above, the network device 102 may perform the first network action by adjusting a number of CCs in CA and/or DC, adjusting a number of MIMO layers, adjusting a bandwidth being used to monitor a PDCCH, adjusting an amount of time slots being used to monitor a PDCCH, changing a traffic path, triggering a switch from a first frequency band to a second frequency band (e.g., from mmWave NR to sub-6 GHz NR or LTE), de-configuring an NR SCG, and/or the like.

After the network device 102 performs the first network action, the network device 102 may set a timer for a first amount of time. Similar to that described above, the first amount of time may be selected randomly, selected based on a determination (e.g., via machine learning, historical data analysis, and/or the like) that the first amount of time will reduce the elevated temperature and/or resolve the elevated temperature state 158 (e.g., reduce the elevated temperature to a temperature that does not satisfy the first temperature threshold), and/or the like. In some implementations, for example when the configuration of the first UE 104 includes UE-based reporting, the first UE 104 may set the timer for the first amount of time after detecting that the network device 102 performed the first network action.

After the first amount of time passes, as shown by reference number 168, the network device 102 may request an updated thermal report, as shown by reference number 170, to determine whether the first network action was successful in resolving the elevated temperature state 158. Similar to that described above, the network device 102 may request the updated thermal report by sending one or more packets on a downlink channel to the first UE 104.

Assume that the elevated temperature of the first UE 104 has decreased to a normal temperature (e.g., a temperature in a particular temperature range, such as a temperature range that does not satisfy any temperature threshold), such that the first UE 104 is in a normal temperature state 172. Complying with the request from the network device 102, the first UE 104 may generate and send the updated thermal report to the network device 102, as shown by reference number 174, by sending one or more packets on an uplink channel. Similar to that described above, the first UE 104 may send the updated thermal report via RRC layer signaling. The updated thermal report may indicate the normal temperature, a lack of satisfaction of any temperature threshold, and/or additional content.

As shown by reference number 176, the network device 102, after receiving the updated thermal report, may determine (e.g., via temperature comparison, and/or the like) that the normal temperature does not satisfy the first temperature threshold, the second temperature threshold, or the third temperature threshold. Thus, as shown in FIG. 1C, the network device 102 may resolve the high temperature state 144 of the first UE 104 in two iterations. In some implementations, however, the network device may use a different number of iterations to resolve the high temperature state 144 of the first UE 104, such as a single iteration or greater than two iterations.

In some implementations, for example when the configuration of the first UE 104 includes UE-based reporting, the first UE 104 may determine (e.g., via a temperature sensor) that the high temperature or the elevated temperature decreased to the normal temperature. In this example, because the first UE 104 determined that no further thermal mitigation was necessary, the first UE 104 may not send the updated thermal report. Thus, with the UE-based reporting, the network device 102 may resolve the high temperature state 144 or the elevated temperature state 158 without the first UE 104 generating and sending the updated thermal report, as shown by reference number 160 or 170, and/or without the network device 102 processing the updated thermal report to determine that the normal temperature state 172 does not satisfy any temperature threshold, as shown by reference number 162 or 176. By eliminating the requesting, generating, sending, and processing of the updated thermal report, computing resources (e.g., processor resources, memory resources, communication resources, and/or the like) and network resources are conserved that would otherwise be used to request, generate, send, and process the updated thermal report.

In FIG. 1D, assume that the first UE 104 is in an extreme temperature state 178, which indicates an extreme temperature (e.g., a temperature in a particular range, such as a temperature range that satisfies the third temperature threshold). In accordance with the configuration, the first UE 104 may compile information from a memory and/or one or more sensors to generate the thermal report. As shown by reference number 180, the first UE 104 may send the thermal report to the network device 102 by sending one or more packets on an uplink channel. Similar to that described above, the first UE 104 may send the thermal report RRC layer signaling. The thermal report may indicate the extreme temperature and/or satisfaction of the third temperature threshold. As described above, the thermal report may include additional content (e.g., specifying a type of the first UE 104, a type of wireless network connection used by the first UE 104, an operating mode of the first UE 104, a battery state of the first UE 104, a capability of the first UE 104, a location of the first UE 104, a thermal history of the first UE 104, and/or the like).

The network device 102, upon receipt of the thermal report and as shown by reference number 182, may determine that the extreme temperature satisfies the third temperature threshold. For example, the network device 102 may compare the extreme temperature indicated in the thermal report with the first temperature threshold, the second temperature threshold, and/or the third temperature threshold. As another example, the network device 102 may determine that the extreme temperature of the first UE 104 satisfies the third temperature threshold based on the thermal report indicating satisfaction of the third temperature threshold.

Based on the extreme temperature satisfying the third temperature threshold, the network device 102 may select a third network action, as shown by reference number 184, from a plurality of network actions. Similar to that described above, the network device 102 may select the third network action in accordance with a selection process. For example, the network device 102 may select the third network action randomly from the plurality of network actions. As another example, the network device 102 may select the third network action from a ranked listing of the plurality of network actions, ordered from most-to-least potential impact on reducing temperature. In this situation, the ranked listing may include the third network action at or near a top of the ranking listing because the third network action is designed to mitigate seriously and/or permanently damaging temperatures. For example, the third network action may include triggering a switch from a first frequency band to a second frequency band (e.g., from mmWave NR to sub-6 GHz NR or LTE), de-configuring one or more NR SCGs, and/or the like. As another example, the network device 102 may select the third network action randomly from a subset of the plurality of network actions that the network device 102 has determined to be most applicable (e.g., given the extreme temperature and/or the additional content). As another example, the network device 102 may select the third network action from a ranked listing of the subset, based on a determination of potential impacts of the plurality of network actions on reducing temperature. As a further example, the network device 102 may use one or more artificial intelligence techniques, such as machine learning, deep learning, and/or the like, to select the third network action from the plurality of network actions. In some implementations, the third network action, selected by the network device 102, may be a network action that has a greater impact on reducing the temperature of the first UE 104 (e.g., reduces the temperature at a faster rate, reduces the temperature by a greater amount, and/or the like) than the first network action selected for when the first UE 104 is in the elevated temperature state 124, 158 and the second network action selected for when the first UE 104 is in the high temperature state 144.

After the network device 102 selects the third network action, as shown by reference number 184, the network device 102 may perform the third network action, as shown by reference number 186. For example, when performing the third network action, the network device 102 may modify a configuration of the network device 102, may modify a configuration of the first UE 104, may modify a manner in which the first UE 104 communicates with the network device 102 or a network with which the first UE 104 is associated, and/or the like. In practice, similar to that described above, the network device 102 may perform the third network action by adjusting a number of CCs in CA and/or DC, adjusting a number of MIMO layers, adjusting a bandwidth being used to monitor a PDCCH, adjusting an amount of time slots being used to monitor a PDCCH, changing a traffic path, triggering a switch from a first frequency band to a second frequency band (e.g., from mmWave NR to sub-6 GHz NR or LTE), de-configuring an NR SCG, and/or the like.

After the network device 102 performs the third network action, the network device 102 may set a timer for a third amount of time. Similar to that described above, the third amount of time may be selected randomly, selected based on a determination (e.g., via machine learning, historical data analysis, and/or the like) that the third amount of time will reduce the extreme temperature and/or resolve the extreme temperature state 178 (e.g., reduce the extreme temperature to a temperature that does not satisfy any temperature threshold, reduce the extreme temperature to a temperature that no longer satisfies the third temperature threshold, and/or the like), and/or the like. In some implementations, for example when the configuration of the first UE 104 includes UE-based reporting, the first UE 104 may set the timer for the third amount of time after detecting that the network device 102 performed the third network action.

After the third amount of time passes, as shown by reference number 188, the network device 102 may request an updated thermal report, as shown by reference number 190, to determine whether the third network action was successful in resolving the extreme temperature state 178. To request the updated thermal report, similar to that described above, the network device 102 may send one or more packets on a downlink channel to the first UE 104.

Assume that the extreme temperature of the first UE 104 has decreased to a normal temperature (e.g., a temperature in a particular temperature range, such as a temperature range that does not satisfy any of the first temperature threshold, the second temperature threshold, or the third temperature threshold), such that the first UE 104 is in a normal temperature state 192. Complying with the request from the network device 102, the first UE 104 may generate and send the updated thermal report to the network device 102, as shown by reference number 194. The updated thermal report may indicate the normal temperature, a lack of satisfaction of any temperature threshold, and/or additional content (e.g., similar to that described above).

As shown by reference number 196, the network device 102, after receiving the updated thermal report, may determine (e.g., via temperature comparison, and/or the like) that the normal temperature does not satisfy the first temperature threshold, the second temperature threshold, or the third temperature threshold. Thus, as shown in FIG. 1D, the network device 102 may resolve the extreme temperature state 178 of the first UE 104 in a single iteration. In some implementations, however, the network device may use a different number of iterations to resolve the extreme temperature state 178, such as two or more iterations that may involve one or more other temperature states, such as the elevated temperature state 124, 158 and/or the high temperature state 144.

In some implementations, for example when the configuration of the first UE 104 includes UE-based reporting, the first UE 104 may determine (e.g., via a temperature sensor) that the extreme temperature decreased to the normal temperature. In this example, because the first UE 104 determined that no further thermal mitigation was necessary, the first UE 104 may not send the updated thermal report. Thus, with the UE-based reporting, the network device 102 may resolve the extreme temperature state 178 without requesting an updated thermal report, as shown by reference number 190, without the first UE 104 generating and sending the updated thermal report, as shown by reference number 194, and/or without the network device 102 processing the updated thermal report to determine that the normal temperature does not satisfy any temperature threshold, as shown by reference number 196. By eliminating the requesting, generating, sending, and processing of the updated thermal report, computing resources (e.g., processor resources, memory resources, communication resources, and/or the like) and network resources are conserved that would otherwise be used to request, generate, send, and process the updated thermal report.

The examples above described the first UE 104 as configured to be in one of four possible temperature states (e.g., a normal temperature state 138, 172, 192; an elevated temperature state 124, 158; a high temperature state 144; and an extreme temperature state 178). In some implementations, the first UE 104 may be configured to be in a lesser number of temperature states. In some implementations, the first UE 104 may be configured to be in a greater number of temperature states.

The examples above described thermal mitigation processes to restore the first UE 104 to the normal temperature state 138, 172, 192. In each example, when the first UE 104 is in the normal temperature state 138, 172, 192, or in any other situation where the first UE 104 is in a temperature state that does not satisfy any of the temperature thresholds, the network device 102 may perform preventative network actions to maintain a normal temperature of the first UE 104. For example, the network device 102 may perform any of the plurality of network actions described above to prevent temperature increase (e.g., by adjusting a number of CCs, by adjusting a number of MIMO layers, by adjusting a bandwidth and/or amount of time slots being used to monitor a PDCCH, and/or the like). In some implementations, the network device 102 may restore an operating mode of the first UE 104 by gradually increasing communication capability of the first UE 104 (e.g., by increasing the number of CCs, by increasing the number of MIMO layers, by increasing the bandwidth and/or the number of time slots used to monitor the PDCCH, by increasing the number of NR SCGs, and/or the like). For example, assume the network device 102 performed a network action of reducing the MIMO layers from a 4×4 configuration to a 2×2 configuration. After the network device 102 determines that the first UE 104 is in a normal temperature state, the network device 102 may restore an operating mode of the first UE 104 by linearly increasing the MIMO layers from the 2×2 MIMO configuration back to the 4×4 MIMO configuration.

As indicated above, FIGS. 1A-1D are provided merely as examples. Other examples are possible and may differ from what is described with regards to FIGS. 1A-1D. The number and arrangement of devices and networks shown in FIGS. 1A-1D are provided as one or more examples. In practice, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of FIGS. 1A-1D may perform one or more functions described as being performed by another set of devices of FIGS. 1A-1D.

Figure 2:
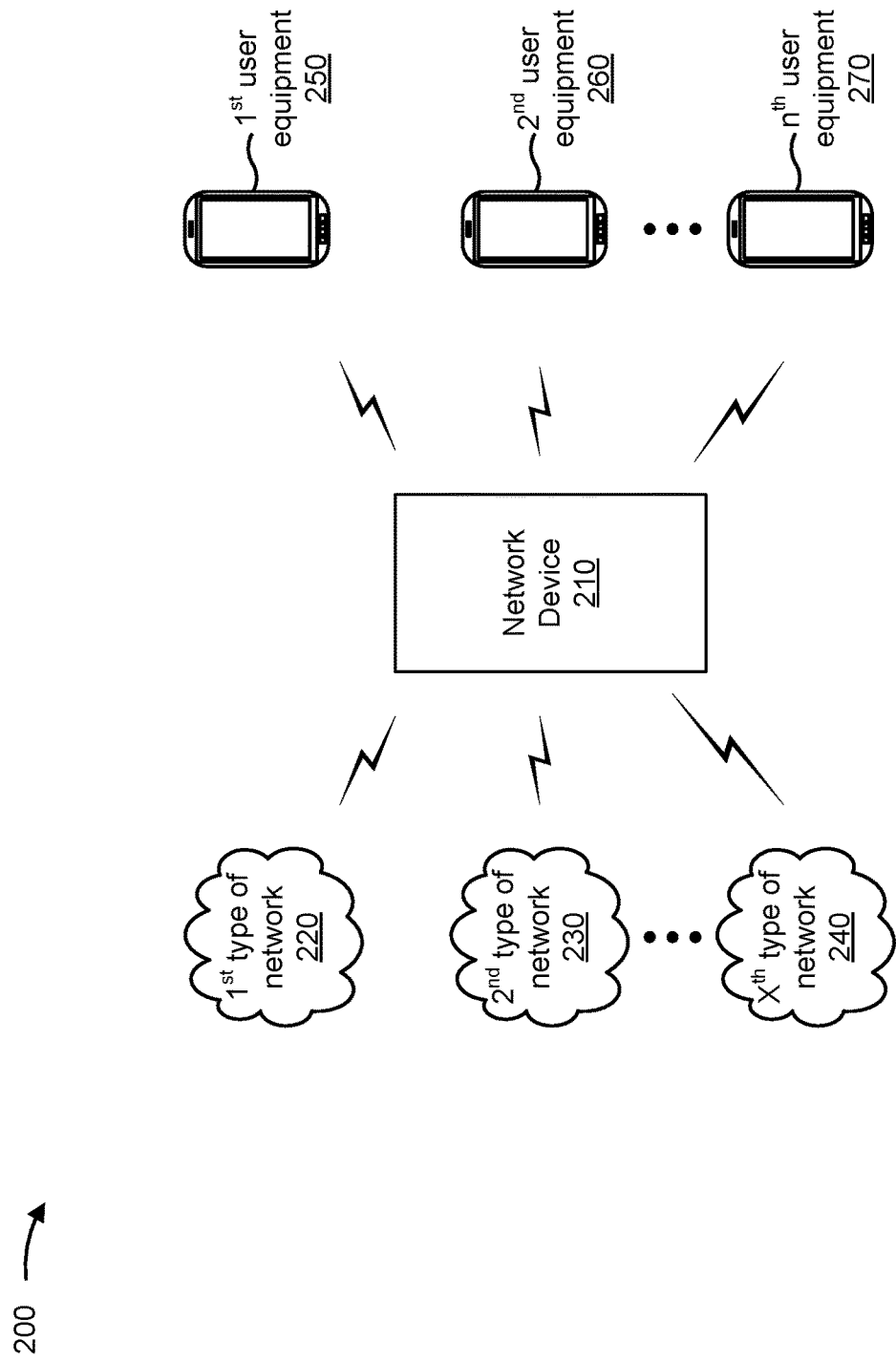
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include network device 210, first type of network 220, second type of network 230, Xth type of network 240, first user equipment (UE) 250, second UE 260, and nth UE 270. Devices of environment 200 may interconnect via wired connections, wireless connections, or a combination of wired and wireless connections.

Network device 210 includes one or more devices capable of performing one or more thermal mitigation measures to reduce an elevated temperature of a UE, such as first UE 250, second UE 260, and/or nth UE 270. For example, network device 210 may include a base station (e.g., an evolved NodeB (eNB), an NR next generation node B (gNB), and/or the like), an access network controller (ANC), a network controller, and/or the like. Network device 210 may correspond to network device 102. Network device 210 may communicate with first type of network 220, second type of network 230, Xth type of network 240, first UE 250, second UE 260, and/or nth UE 270 to perform one or more thermal mitigation measures to reduce a temperature of first UE 250, second UE 260, and/or nth UE 270.

First type of network 220, second type of network 230, and Xth type of network 240 include different types of cellular networks. For example, first type of network 220, second type of network 230, and Xth type of network 240 may include a fifth generation (5G) network, a long-term evolution (LTE) network, a fourth generation (4G) network, a third generation (3G) network, a code division multiple access (CDMA) network, and/or the like. First type of network 220, second type of network 230 and/or Xth type of network 240 may implement radio access technology (RAT) to enable first UE 250, second UE 260, nth UE 270, and network device 210 to communicate with each other, other UEs, and other network devices.

First UE 250, second UE 260, and nth UE 270 include user equipment capable of receiving, generating, storing, processing, and/or providing information, such as information described herein. For example, first UE 250, second UE 260, and nth UE 270 may include a computer (e.g., a desktop computer, a laptop computer, a tablet computer, a handheld computer, a server device, etc.), a mobile phone (e.g., a smart phone, a radiotelephone, etc.), an interne of things (IoT) device or smart appliance, a user equipment (e.g., user equipment 104, 106, 108, and/or the like), or a similar device. First UE 250, second UE 260, and nth UE 270 may receive information and/or instructions from network device 210 related to thermal mitigation.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
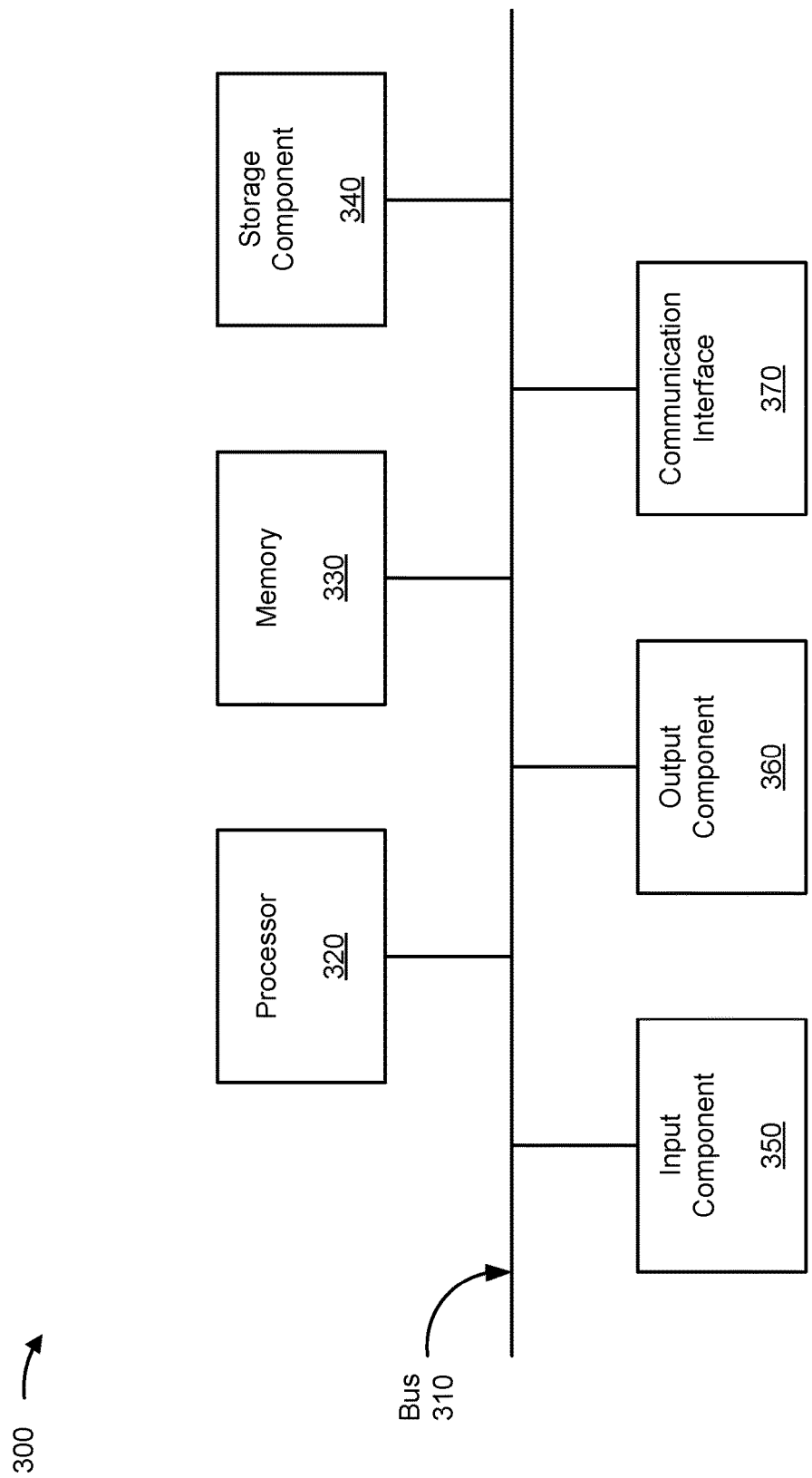
FIG. 3 is a diagram of example components of one or more devices of FIG. 2.

FIG. 3 is a diagram of example components of a device 300. Device 300 may correspond to network device 210, first UE 250, second UE 260, and/or nth UE 270. In some implementations, network device 210, first UE 250, second UE 260, and/or nth UE 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
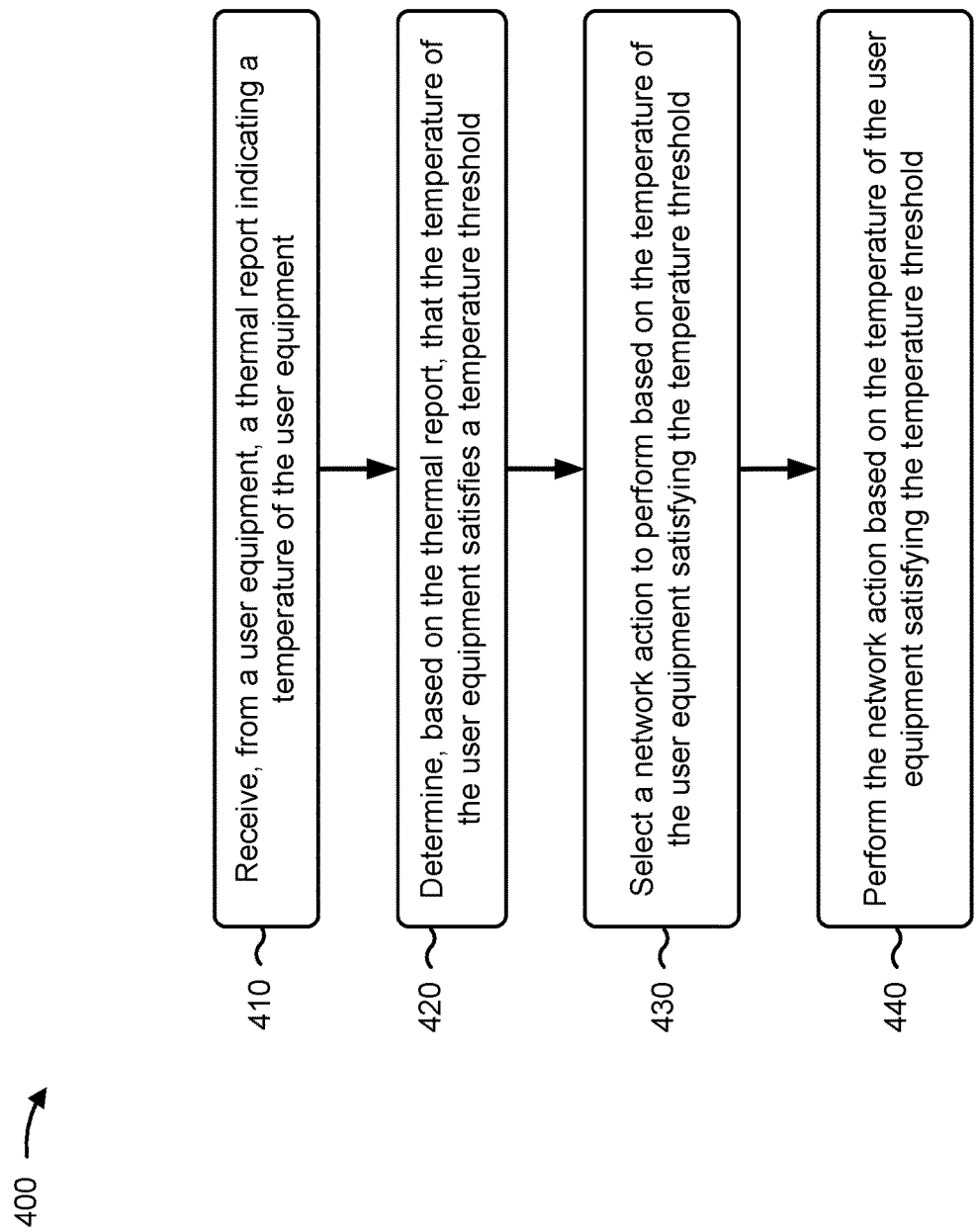
FIG. 4 is a flow chart of an example process for reducing a temperature of a user equipment.

FIG. 4 is a flow chart of an example process 400 for reducing a temperature of a user equipment. In some implementations, one or more process blocks of FIG. 4 may be performed by a network device (e.g., network device 102, network device 210, and/or the like). In some implementations, one or more process blocks of FIG. 4 may be performed by another device or a group of devices separate from or including the network device, such as user equipment (UE) (e.g., first UE 104, second UE 106, nth UE 108, first UE 250, second UE 260, nth UE 270, and/or the like).

As shown in FIG. 4, process 400 may include receiving, from the user equipment, a thermal report, the thermal report indicating a temperature of the user equipment (block 410). For example, the network device (e.g., using processor 320, memory 330, storage component 340, input component 350, output component 360, communication interface 370 and/or the like) may receive, from the user equipment, a thermal report, the thermal report indicating a temperature of the user equipment, as described above. In some implementations, the thermal report identifies one or more characteristics of the user equipment, the one or more characteristics including a type of the user equipment, a type of wireless network connection used by the user equipment, an operating mode of the user equipment, a battery state of the user equipment, a capability of the user equipment, a location of the user equipment, or a thermal history of the user equipment. In some implementations, when the thermal report is preceded by prior thermal reports from the user equipment, the thermal report includes a thermal history of the user equipment. The thermal history incorporates the prior thermal reports, prior network actions, and corresponding results of the prior network actions.

As further shown in FIG. 4, process 400 may include determining, based on the thermal report, that the temperature of the user equipment satisfies a temperature threshold (block 420). For example, the network device (e.g., using processor 320, memory 330, storage component 340, input component 350, output component 360, communication interface 370 and/or the like) may determine, based on the thermal report, that the temperature of the user equipment satisfies a temperature threshold, as described above. In some implementations, the temperature threshold is one of a first temperature threshold or a second temperature threshold, the first temperature threshold indicating a first temperature, the second temperature threshold indicating a second temperature, and the second temperature being greater than the first temperature. In some implementations, the temperature threshold is one of a first temperature threshold, a second temperature threshold, or a third temperature threshold, the first temperature threshold indicating a first temperature, the second temperature threshold indicating a second temperature, the third temperature threshold indicating a third temperature threshold, the second temperature being greater than the first temperature, and the third temperature being greater than the second temperature.

As further shown in FIG. 4, process 400 may include selecting a network action to perform based on the temperature of the user equipment satisfying the temperature threshold (block 430). For example, the network device (e.g., using processor 320, memory 330, storage component 340, input component 350, output component 360, communication interface 370 and/or the like) may select a network action to perform based on the temperature of the user equipment satisfying the temperature threshold, as described above. In some implementations, the network action includes one or more of: reducing a number of component carriers to be used by the user equipment, reducing a number of multiple input multiple output layers to be used by the user equipment, reducing a bandwidth where the user equipment is to monitor a physical downlink control channel, reducing an amount of time slots where the user equipment is to monitor a physical downlink control channel, changing a traffic path to be used by the user equipment, triggering a switch of the user equipment a first frequency band to a second frequency band (e.g., from mmWave NR to sub-6 GHz NR or LTE), or de-configuring one or more new radio secondary cell groups associated with the user equipment. In some implementations, the selecting of the network action is further based on one or more characteristics of the user equipment (e.g., a thermal history).

As further shown in FIG. 4, process 400 may include performing the network action based on the temperature of the user equipment satisfying the temperature threshold (block 440). For example, the network device (e.g., using processor 320, memory 330, storage component 340, input component 350, output component 360, communication interface 370 and/or the like) may perform the network action based on the temperature of the user equipment satisfying the temperature threshold, as described above. In some implementations, the network action is one of a first network action or a second network action, the first network action being performed when the temperature of the user equipment satisfies the first temperature threshold, the second network action being performed when the temperature of the user equipment satisfies the second temperature threshold, and the second network action being designed to have a larger impact on reducing the temperature of the user equipment than the first network action. In some implementations, the network action is one of a first network action, a second network action, or a third network action, the first network action being performed when the temperature of the user equipment satisfies the first temperature threshold, the second network action being performed when the temperature of the user equipment satisfies the second temperature threshold, the third network action being performed when the temperature of the user equipment satisfies the third temperature threshold, the third network action being designed to have a larger impact on reducing temperature of the user equipment that the second network action, and the second network action being designed to have a larger impact on reducing the temperature of the user equipment than the first network action.

Process 400 may further include sending configuration instructions to the user equipment. In some implementations, the configuration instructions include an instruction that the user equipment, after sending the thermal report: set a timer; and send, after the timer satisfies a time threshold, a second thermal report, the second thermal report indicating an updated temperature of the user equipment. In some implementations, the configuration instructions include one or more of: an instruction that the user equipment send the thermal report to the network device after the user equipment determines that the temperature satisfies the temperature threshold; an instruction that the user equipment send the thermal report to the network device at a regular time interval; or an instruction that the user equipment send the thermal report to the network device after the network device sends a request to the user equipment for the thermal report. In some implementations, the configuration instructions include an instruction specifying content of the thermal report, the content identifying: the temperature of the user equipment; and one or more characteristics of the user equipment, the one or more characteristics including a type of the user equipment, a type of wireless network connection, an operating mode of the user equipment, a battery state of the user equipment, capability of the user equipment, a location of the user equipment, or a thermal history of the user equipment.

Process 400 may further include obtaining a second thermal report from the user equipment, the second thermal report indicating an updated temperature of the user equipment. In some implementations, process 400 can further include setting a timer and obtaining the second thermal report from the user equipment after the timer satisfies a time threshold. In some implementations, process 400 can further include repeating, one or more times and based on the updated temperature of the user equipment satisfying the temperature threshold, the determining, the selecting, and the selectively performing until the updated temperature of the user equipment no longer satisfies the temperature threshold.

Process 400 may further include sending second configuration instructions to a second user equipment, receiving, from the second user equipment, a second thermal report, the second thermal report indicating a second temperature of the second user equipment; determining, based on the second thermal report, that the second temperature of the second user equipment satisfies the temperature threshold; selecting a second network action to perform, to reduce the second temperature of the second user equipment, based on the second temperature of the second user equipment satisfying the temperature threshold; and performing the second network action to reduce the second temperature of the second user equipment based on the second temperature of the second user equipment satisfying the temperature threshold.

Process 400 can include additional implementations, such as any single implementation or any combination of implementations described above and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   sending, by a network device, a request for a thermal report to a user equipment;
   receiving, by the network device, the thermal report indicating a temperature of the user equipment;
   generating, by the network device, a ranked listing of a plurality of network actions based on a determination of impacts of the plurality of network actions on reducing the temperature of the user equipment,
      the ranked listing ordering the plurality of network actions based on impact with respect to the temperature of the user equipment;
   determining, by the network device based on the thermal report, that the temperature of the user equipment satisfies a temperature threshold; and
   performing, by the network device, a network action, from the plurality of network actions, when the temperature of the user equipment satisfies the temperature threshold based on the network action being associated with a location in the ranked listing.

2. The method of claim 1, wherein performing the network action comprises:
   performing an action to reduce the temperature of the user equipment; and
   the method further comprising:
      setting a timer for an amount of time after performing the action;
      requesting an updated thermal report with an updated temperature from the user equipment after the amount of time passes; and
      determining whether the updated temperature satisfies the temperature threshold based on the updated thermal report.

3. The method of claim 1, further comprising:
   restoring an operating mode of the user equipment by increasing a communication capability of the user equipment.

4. The method of claim 1, wherein the thermal report is a first thermal report; and
   wherein the method further comprises:
      obtaining a second thermal report indicating an updated temperature of the user equipment; and
      repeating, one or more times, the determining, and the performing until the updated temperature of the user equipment does not satisfy the temperature threshold.

5. The method of claim 1, wherein the network action includes one or more of:
   reducing a number of component carriers to be used by the user equipment,
   reducing a number of multiple input multiple output layers to be used by the user equipment,
   reducing a bandwidth where the user equipment is to monitor a physical downlink control channel,
   reducing an amount of time slots where the user equipment is to monitor a physical downlink control channel,
   changing a traffic path to be used by the user equipment,
   triggering a switch of the user equipment to switch from a first frequency band to a second frequency band, or
   de-configuring one or more new radio secondary cell groups associated with the user equipment.

6. The method of claim 1, further comprising:
   selecting the network action using machine learning;
   wherein performing the network action comprises:
      performing the network action based on the machine learning.

7. A device, comprising:
   one or more processors configured to:
      send a request to a user equipment,
         the request causing the user equipment to send a thermal report after the request is received by the user equipment;
      receive the thermal report indicating a temperature of the user equipment;
      generate a ranked listing of a plurality of network actions based on a determination of impacts of the plurality of network actions on reducing the temperature of the user equipment,
         the ranked listing ordering the plurality of network actions based on impact with respect to the temperature of the user equipment;
      determine, based on the thermal report, that the temperature of the user equipment satisfies a temperature threshold; and
      perform a network action, from the plurality of network actions, when the temperature of the user equipment satisfies the temperature threshold based on the network action being associated with a location in the ranked listing.

8. The device of claim 7, wherein the thermal report is a first thermal report; and
   wherein the one or more processors are further configured to:
      obtain, after a particular amount of time, a second thermal report indicating an updated temperature of the user equipment; and
      repeat, one or more times and based on the updated temperature of the user equipment satisfying the temperature threshold, the determining and the performing until the updated temperature of the user equipment no longer satisfies the temperature threshold.

9. The device of claim 7, wherein the one or more processors, when receiving the thermal report indicating the temperature of the user equipment, are to:
receive the thermal report via radio resource control (RRC) layer signaling.

10. The device of claim 7, wherein the one or more processors, when performing the network action, are to:
perform an action to reduce the temperature of the user equipment.

11. The device of claim 7, wherein the one or more processors, when performing the network action, are to:
trigger a switch of the user equipment from a first frequency band to a second frequency band, or
de-configure one or more new radio secondary cell groups associated with the user equipment.

12. The device of claim 7, wherein, when the thermal report is preceded by one or more prior thermal reports from the user equipment, the thermal report includes a thermal history of the user equipment,
the thermal history incorporating the one or more prior thermal reports, one or more prior network actions, and corresponding results of the one or more prior network actions; and
wherein the one or more processors, when selecting the network action, are configured to:
select the network action based on the thermal history of the user equipment.

13. The device of claim 7, wherein the one or more processors, when receiving the thermal report indicating the temperature of the user equipment, are to:
receive the thermal report via one or more packets on an uplink channel.

14. A non-transitory computer-readable medium storing instructions, the instructions comprising:
one or more instructions that, when executed by one or more processors, cause the one or more processors to:
send an instruction to a user equipment,
the instruction causing the user equipment to send a thermal report after a request for the thermal report is received by the user equipment;
receive the thermal report indicating a temperature of the user equipment;
generate a ranked listing of a plurality of network actions based on a determination of impacts of the plurality of network actions on reducing the temperature of the user equipment,
the ranked listing ordering the plurality of network actions based on impact with respect to the temperature of the user equipment;
determine, based on the thermal report, that the temperature of the user equipment satisfies a temperature threshold; and
perform a network action, from the plurality of network actions, when the temperature of the user equipment satisfies the temperature threshold based on the network action being associated with a location in the ranked listing.

15. The non-transitory computer-readable medium of claim 14, wherein the thermal report is a first thermal report;
wherein the instructions include an instruction that the user equipment, after sending the thermal report, send a second thermal report indicating an updated temperature of the user equipment; and
wherein the one or more instructions, when executed by the one or more processors, further cause the one or more processors to:
receive the second thermal report from the user equipment, and
repeat, one or more times and based on the updated temperature of the user equipment satisfying the temperature threshold, the determining and performing until the updated temperature of the user equipment no longer satisfies the temperature threshold.

16. The non-transitory computer-readable medium of claim 14, wherein the one or more instructions, that cause the one or more processors to receive the thermal report, cause the one or more processors to:
receive the thermal report via radio resource control (RRC) layer signaling.

17. The non-transitory computer-readable medium of claim 14, wherein the one or more instructions, that cause the one or more processors to perform the network action, cause the one or more processors to:
reduce a number of component carriers to be used by the user equipment,
reduce a number of multiple input multiple output layers to be used by the user equipment, or
reduce a bandwidth where the user equipment is to monitor a physical downlink control channel.

18. The non-transitory computer-readable medium of claim 14, wherein the instructions comprise:
an instruction specifying content of the thermal report,
the content identifying:
the temperature of the user equipment, and
one or more characteristics of the user equipment including:
a type of the user equipment,
a type of wireless network connection used by the user equipment,
an operating mode of the user equipment,
a battery state of the user equipment,
a capability of the user equipment, or
a location of the user equipment; and
wherein the one or more instructions, when executed by the one or more processors, further cause the one or more processors to:
select the network action based on the one or more characteristics of the user equipment.

19. The method of claim 1, wherein the ranked listing orders the plurality of network actions from a network action, of the plurality of network actions, having a highest potential impact on reducing temperature.

20. The non-transitory computer-readable medium of claim 14, wherein the ranked listing orders the plurality of network actions from a network action, of the plurality of network actions, having a highest potential impact on reducing temperature.

* * * * *